(12) United States Patent
Kiuchi et al.

(10) Patent No.: US 12,498,685 B2
(45) Date of Patent: Dec. 16, 2025

(54) SIMULATION-BASED OPTIMIZATION CONFIGURATOR TO SUPPORT RAPID DECISION-MAKING

(71) Applicant: Hitachi, Ltd., Tokyo (JP)

(72) Inventors: Atsuki Kiuchi, Santa Clara, CA (US); Haiyan Wang, Fremont, CA (US); Chetan Gupta, San Mateo, CA (US)

(73) Assignee: HITACHI, LTD., Tokyo (JP)

( * ) Notice: Subject to any disclaimer, the term of this patent is extended or adjusted under 35 U.S.C. 154(b) by 420 days.

(21) Appl. No.: 18/101,518

(22) Filed: Jan. 25, 2023

(65) Prior Publication Data

US 2024/0248438 A1 Jul. 25, 2024

(51) Int. Cl.
*G05B 13/04* (2006.01)
*G06Q 10/0639* (2023.01)

(52) U.S. Cl.
CPC ..... *G05B 13/042* (2013.01); *G06Q 10/06393* (2013.01)

(58) Field of Classification Search
None
See application file for complete search history.

(56) References Cited

U.S. PATENT DOCUMENTS

| | | | | |
|---|---|---|---|---|
| 5,471,408 A | * | 11/1995 | Takamoto | G06Q 10/06 703/2 |
| 11,223,546 B2 | | 1/2022 | Schibler et al. | |
| 11,836,164 B2 | * | 12/2023 | Gunnerud | E21B 21/08 |
| 2018/0357552 A1 | * | 12/2018 | Campos | G06N 5/043 |
| 2020/0050717 A1 | * | 2/2020 | Kiribuchi | G06F 30/20 |
| 2020/0396148 A1 | * | 12/2020 | Schibler | H04L 43/0817 |
| 2022/0075515 A1 | * | 3/2022 | Floren | G06F 3/04847 |
| 2022/0236965 A1 | * | 7/2022 | Rahill-Marier | G06F 9/451 |
| 2023/0259830 A1 | * | 8/2023 | Subramanian | G06N 3/0499 706/12 |

OTHER PUBLICATIONS

Mota et al, "Applied Simulation and Optimization", 2015. Springer, pp. 5-11, 52-55 (Year: 2015).*

(Continued)

*Primary Examiner* — David Earl Ogg
(74) *Attorney, Agent, or Firm* — PROCOPIO, CORY, HARGREAVES & SAVITCH LLP

(57) ABSTRACT

Conventional simulation-based optimization, even when automated, requires substantial user-involved development time. Accordingly, embodiments are disclosed to automate various aspects of simulation-based optimization. In particular, an optimization configurator and associated data structures are disclosed for generating and running optimization templates that can be easily constructed (e.g., via lists of available components), revised, evaluated, and re-run as needed. The optimization templates may comprise a plurality of optimization configurations that each define and pair an optimization algorithm with a simulator of a real-world system. Embodiments can reduce development time, are applicable to various domains, can be used by novice users without specialized knowledge, and can improve the overall quality of optimization for the operations of real-world systems, such as supply chains.

16 Claims, 11 Drawing Sheets

(56) References Cited

OTHER PUBLICATIONS

Kiuchi, Atsuki et al., "Development of Agent-based Supply Chain Management Simulator", 2016, 5 pages.
Kiuchi, Atsuki et al., "Bayesian Optimization Algorithm with Agent-based Supply Chain Simulator for Multi-echelon Inventory Management", IEEE 16th Case, 2020, 8 pages.
Arisha, Amr et al. "Simulation Optimization Methods in Supply Chain Applications: A Review", Irish Journal of Management, vol. 30, pp. 95-124, Jul. 18, 2011. College of Business, Dublin Institute of Technology, 32 pages.

\* cited by examiner

— 310

| SiteName | ItemID | ParameterID | Directory | FileName | Index | ColumnName |
|---|---|---|---|---|---|---|
| Warehouse1 | ItemA | $x_3$ | ./SC | SimulatorInput.csv | 1 | InventoryParam1 |
| Warehouse1 | ItemA | $x_4$ | ./SC | SimulatorInput.csv | 2 | InventoryParam2 |
| Warehouse2 | ItemA | $x_1$ | ./SC | SimulatorInput.csv | 3 | InventoryParam1 |
| Warehouse3 | ItemA | $x_2$ | ./SC | SimulatorInput.csv | 4 | InventoryParam2 |

— 320

| SiteName | ItemID | KPI | KPIValue |
|---|---|---|---|
| Warehouse1 | ItemA | AverageInventory | 12403.13 |
| Warehouse2 | ItemA | AverageInventory | 43215.09 |
| TotalInventory | ItemA | AverageInventory | 34010.68 |

| SimulatorID | SimulatorName |
|---|---|
| SCSim | SC Simulator |
| NetOpt | SC Network Optimizer |
| Scheduler | Production Scheduler |

520

| OptimizationAlgorithmID | AlgorithmName |
|---|---|
| GA | Genetic Algorithm |
| BO | Bayesian Optimization |
| CBO | Constraint Bayesian Optimization |

530

| SimulatorID | ObjectiveFunctionID | ObjectiveFunctionName | FileName | Index | ColumnName |
|---|---|---|---|---|---|
| SCSim | AvgInv | Average Inventory | SimulatorOutput | 3 | KPIValue |

540

| SimulatorID | ParameterID | ParameterName | ParameterType | LowerBound | UpperBound | Step | FileName | Index | ColumnName |
|---|---|---|---|---|---|---|---|---|---|
| SCSim | $x_1$ | Quantity | integer | 0 | 10000 | | SimulatorInput | 3 | ParameterID |
| SCSim | $x_2$ | Period | integer | 0 | 10000 | | SimulatorInput | 4 | ParameterID |
| SCSim | $x_3$ | Threshold | integer | 0 | 10000 | | SimulatorInput | 1 | ParameterID |
| SCSim | $x_4$ | Quantity | integer | 0 | 10000 | | SimulatorInput | 2 | ParameterID |
| SCSim | OFR | Order Fulfillment Rate | double | 0 | 10000 | | SimulatorOutput | 4 | SiteName |

FIG. 7B

SIMULATION-BASED OPTIMIZATION CONFIGURATOR TO SUPPORT RAPID DECISION-MAKING

BACKGROUND

Field of the Invention

The embodiments described herein are generally directed to simulation-based optimization, and, more particularly, to an optimization configurator that supports rapid decision-making in simulation-based optimization.

Description of the Related Art

A digital twin can be used to duplicate complex real-world systems, such as a supply chain management (SCM) system. The digital twin may be used to simulate the real-world system. However, the simulation of a real-world system requires numerous parameters, such as, in the case of supply chain management, the quantity of inventory across a plurality of sites. An example of an agent-based SCM simulator using a digital twin is described in Kiuchi et al., "Development of Agent-based Supply Chain Management Simulator," The Proceedings of Mechanical Engineering Congress, Japan 2016, S1420102, 2016, which is hereby incorporated herein by reference in its entirety.

Simulation-based optimization is used to determine the optimal parameters using such a simulator. For example, Kiuchi et al., "Bayesian Optimization Algorithm with Agent-based Supply Chain Simulator for Multi-echelon Inventory Management," IEEE 16th CASE, 2020, which is hereby incorporated herein by reference in its entirety, describes an algorithm based on Bayesian optimization. Abo-Hamad et al., "Simulation Optimization Methods in Supply Chain Applications: a Review, Irish Journal of Management, vol. 30, pp. 95-124, 2011, which is hereby incorporated herein by reference in its entirety, describes other approaches for simulation-based optimization.

Simulation-based optimization can be especially advantageous in supply chain management. For example, simulation-based optimization may be performed periodically (e.g., daily) to output an optimized inventory plan for each site and inventory item, based on forecasted demand, a sales plan, actual demand, and/or the like. This may enable a supply chain manager to rapidly address changing circumstances, so as to maintain desired values for key performance indicators (KPIs). Examples of such circumstances include increases in demand for products (e.g., goods or services), logistical disruptions, supply shortages, labor shortages, increases in fuel prices, regional instability, changes in tariffs, pandemic lockdowns, and/or the like.

A user of simulation-based optimization must select and test an optimization algorithm to optimize parameters for each simulation. For example, U.S. Patent Pub. No. 2018/0357552 A1 describes a method for selecting an optimization algorithm, and U.S. Pat. No. 11,223,546 describes a system for optimizing parameters in a simulator. However, the user must develop a script for every optimization algorithm that the user wishes to evaluate (e.g., in terms of optimality, computational time, etc.). In addition, if the user wishes to optimize parameters for a plurality of simulators, the user must develop a script for every optimization algorithm for every simulator. It takes significant time for the user to develop these scripts.

SUMMARY

Accordingly, systems, methods, and non-transitory computer-readable media are disclosed for a simulation-based optimization configurator that may reduce the time required to evaluate a plurality of optimization algorithms for a plurality of simulators, to facilitate selection of the optimal optimization algorithm (e.g., in terms of optimality, computational time, etc.) for each simulator.

In an embodiment, a method comprises using at least one hardware processor to: generate an optimization template by receiving one or more optimization configurations, each of the one or more optimization configurations associating an optimization algorithm with a simulator of a real-world system, receiving one more objective functions, each of the one or more objective functions associated with one of the one or more optimization configurations, receiving one or more variables, each of the one or more variables associated with one of the one or more objective functions, and receiving one or more constraints, each of the one or more constraints associated with one of the one or more objective functions; perform an optimization on the optimization template by, for each of the one or more objective functions associated with each of the one or more optimization configurations in the optimization template, executing the optimization algorithm in the optimization configuration to determine values for the one or more variables, associated with the objective function, that optimize the objective function, while constrained by the one or more constraints associated with the objective function, using the simulator in the optimization configuration; and output an optimal solution based on the performed optimization.

The optimization template may be generated by further receiving one or more batch configurations, each of the one or more batch configurations comprising a plurality of optimization configurations, and wherein the optimization is performed for each of the one or more objective functions associated with each of the one or more optimization configurations in each of the one or more batch configurations in the optimization template.

The method may further comprise using the at least one hardware processor to, after performing the optimization, over each of one or more subsequent iterations: receive a user operation comprising one or more changes to the optimization template; incorporate the one or more changes into the optimization template; and perform the optimization on the changed optimization template.

Each simulator may utilize a digital twin of the real-world system to generate an output from an input. Using the simulator associated with the optimization algorithm may comprise: converting candidate values for the one or more variables into the input; and applying the simulator to the input to generate the output. The output of each simulator may be a key performance indicator for the real-world system. The real-world system may comprise a supply chain. The output of each simulator may comprise one or both of an average inventory quantity or an order fulfillment rate.

Receiving one or more optimization configurations may comprise receiving a user selection of the one or more optimization configurations from among a plurality of available optimization configurations.

Receiving one or more objective functions may comprise receiving a user selection of the one or more objective functions from among a plurality of available objective functions.

Receiving one or more variables may comprise receiving a user selection of the one or more variables from among a plurality of available variables, wherein receiving one or more constraints comprises receiving a user selection of the one or more constraints from among a plurality of available constraints.

The one or more objective functions may be a plurality of objective functions. The one or more optimization configurations may be a plurality of optimization configurations. At least one of the plurality of optimization configurations may associate a different optimization algorithm with a same simulator, associate a same optimization algorithm with a different simulator, or associate a different optimization algorithm with a different simulator, than another one of the plurality of optimization configurations. A first one of the plurality of optimization configurations may associate a first optimization algorithm with a first simulator of a first real-world system, wherein a second one of the plurality of optimization configurations associates the first optimization algorithm with a second simulator of a second real-world system that is different from the first real-world system.

The optimal solution may comprise, for each of the one or more objective functions associated with each of the one or more optimization configurations in the optimization template, the determined values for the one or more variables. The optimal solution may further comprise, for each of the one or more objective functions associated with each of the one or more optimization configurations in the optimization template, an output of a target value of the objective function for the determined values of the one or more variables, and values of the one or more constraints.

The method may further comprise using the at least one hardware processor to initiate control of the real-world system based on the optimal solution.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

FIGS. 7A-7D illustrate some examples of data objects for simulation-based optimization using the simulator illustrated in FIG. 3, according to an embodiment.

DETAILED DESCRIPTION

In an embodiment, systems, methods, and non-transitory computer-readable media are disclosed for a simulation-based optimization configurator. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Infrastructure

Figure 1:
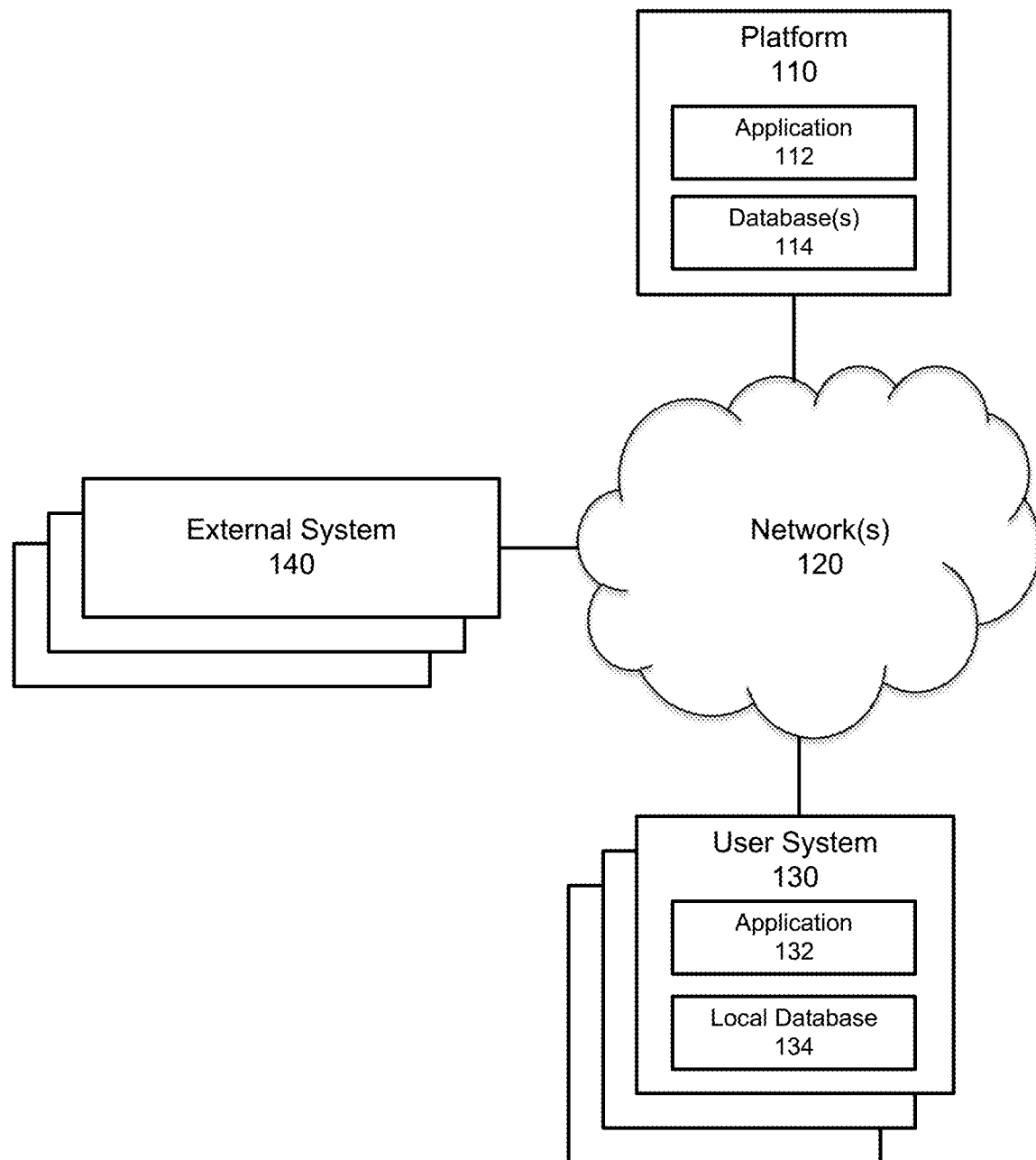
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead be implemented in a computing cloud, in which the resources of one or more servers are dynamically and elastically allocated to multiple tenants based on demand. In either case, the servers may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that a user system 130 would comprise the personal computer or professional workstation of a user representing an entity (e.g., business, non-profit organization, government agency, etc.) that manages a real-world system, such as a supply chain. Each user system 130 may comprise or be communicatively connected to a client application 132 and/or one or more local databases 134.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. It should be understood that platform 110 may also respond to other requests from user system(s) 130.

Platform 110 may comprise, be communicatively coupled with, or otherwise have access to one or more database(s) 114. For example, platform 110 may comprise one or more database servers which manage one or more databases 114. Server application 112 executing on platform 110 and/or client application 132 executing on user system 130 may submit data (e.g., user data, form data, etc.) to be stored in database(s) 114, and/or request access to data stored in database(s) 114. These data may comprise the various instances of data structures described throughout the present disclosure. Any suitable database may be utilized, including without limitation MySQL™, Oracle™, IBM™, Microsoft SQL™, Access™, PostgreSQL™, MongoDB™, and the like, including cloud-based databases and proprietary databases. Database(s) 114 may comprise structured data (e.g., relational databases) and/or unstructured data (e.g., images, videos, electronic documents, etc.). Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from user system(s) 130 and/or external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130, may interact with a server application 112 executing on platform 110 to execute one or more or a portion of one or more of the various functions, processes, methods, and/or software modules described herein.

Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the software described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions described herein.

2. Example Processing System

Figure 2:
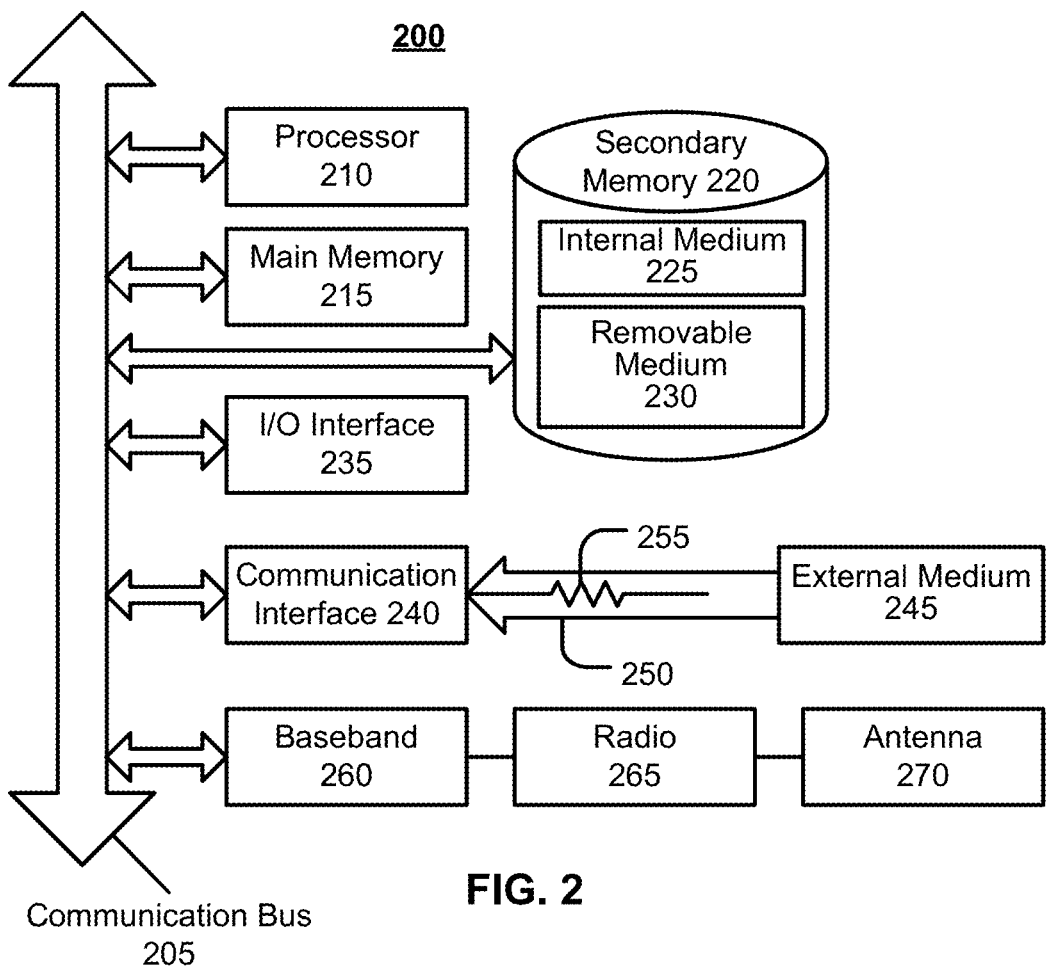
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the software) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 include an external hard disk drive, an external optical drive, an external magneto-optical drive, and/or the like.

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225 and/or removable medium 230), external storage medium 245, and any peripheral device communicatively coupled with communication interface 240 (including a network information server or other network device). These non-transitory computer-readable media are means for providing software and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210. Processor(s) 210 may have access to data storage areas 215 and 220. Processor(s) 210 are preferably configured to execute instructions (i.e., computer programs, such as the disclosed software) that can be stored in main memory 215 or secondary memory 220. Computer programs can also be received from baseband processor 260 and stored in main memory 210 or in secondary memory 220, or executed upon receipt. Such computer programs, when executed, can enable system 200 to perform the various functions of the disclosed embodiments.

3. Simulation-Based Optimization

Figure 3:
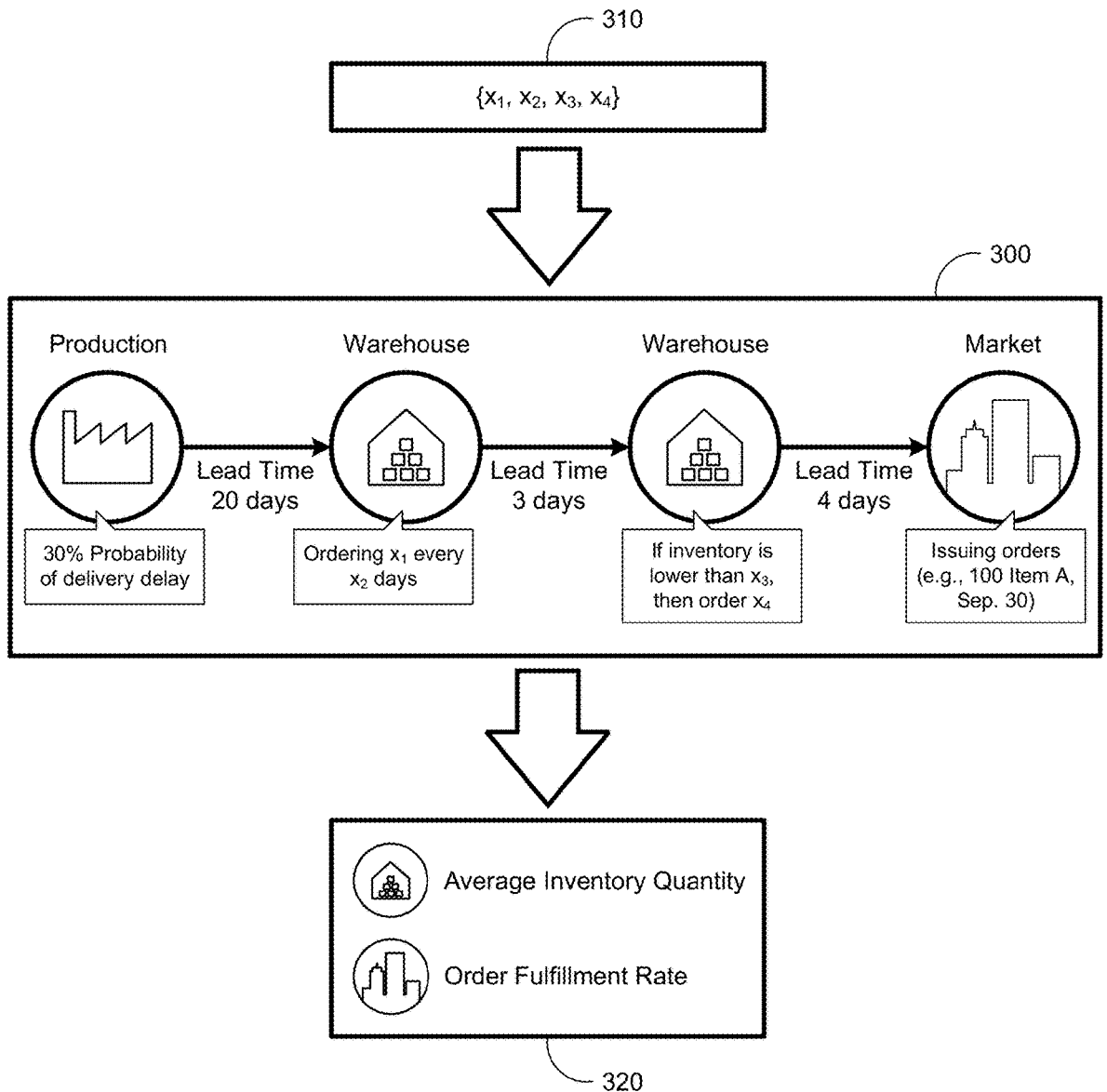
FIG. 3 illustrates an example of a simulator for supply chain management, according to an embodiment.

FIG. 3 illustrates an example of a simulator 300, according to an embodiment. Simulator 300 may be implemented in any suitable manner. For example, simulator 300 may comprise a machine-learning model or other artificial intelligence (e.g., rules-based artificial intelligence). Simulator 300 simulates the operation of a real-world system using a digital twin of the real-world system. In the illustrated example, the real-world system is a supply chain, which may comprise procurement, production, warehousing, transportation, sales, market, and/or other components. It should be understood that simulator 300 may simulate any real-world system.

Simulator 300 is illustrated using a simple example of a supply chain that consists of production which manufactures items, warehousing which stores items as inventory on the way to market, and a market which orders the items. It should that be understood that, in practice, simulator 300 may be much more complex, with hundreds or thousands of components. The components of simulator 300 may be represented as a network of nodes. In the case of a supply chain, each node may have logic to move inventory. The inventory is used to fulfill demand from the market, which may issue orders at random. Simulator 300 may comprise one or more variables (e.g., in the logic of the nodes) whose value(s) define an operating configuration for the real-world system.

Simulator 300 receives an input 310, comprising a value for each of one or more, and generally a plurality of, input parameters. These parameters may comprise at least the one or more variables in simulator 300. In the illustrated example, the variables are $\{x_1, x_2, x_3, x_4\}$, wherein $x_1$ represents the quantity of items being periodically ordered for warehousing, $x_2$ represents the time interval at which the items are being periodically ordered for warehousing, $x_3$ represents a threshold that triggers ordering, and $x_4$ represents the quantity of items that are ordered when the threshold triggers ordering.

Based on the values of the input parameters in input 310, simulator 300 outputs an output 320, comprising the value of each of one or more output parameters. Generally, the output parameters will comprise at least key performance indicators, representing performance of the simulation using the values of the input parameters in input 310 with the digital twin of the real-world system. In the illustrated example, the output parameters comprise an average inventory quantity in warehousing and an order fulfillment rate in the market.

In simulation-based optimization, simulator 300 is used to optimize the values of the variable(s) in simulator 300. For example, a user could manually modify the value of each variable in input 310, over a plurality of iterations, to improve the value of one or more key performance indicators in output 320. The set of final value(s) for the variable(s) in simulator 300 represents the solution of the optimization. However, manual optimization is a time-intensive process that cannot guarantee an optimal solution. Moreover, in the event that the number of variables is large (e.g., hundreds, thousands, or millions of variables), manual optimization becomes infeasible, even for a single simulator 300.

Accordingly, automated optimization is required for a large number of variables. However, even automated optimization may require some user input. In particular, a user may need to select the objective function, the variable(s), and the constraint(s) to be used for optimization. These selections may generally be made based on information about simulator 300. For example, the objective function may be to minimize or maximize the value of a target value (e.g., key performance indicator in output 320), the variable(s) to be used for optimization may be selected from the variables in simulator 300 and input 310, and each constraint may be a constraint on the value of a variable in input 310 and/or on the value of a key performance indicator in output 320. In the illustrated example for a supply chain, the objective function may be to minimize average inventory quantity, the variables may be $\{x_1, x_2, x_3, x_4\}$, and the constraint may be that the order fulfillment rate in output 320 must be greater than 90%.

A user may also need to select the optimization algorithm to be used for automated optimization. In particular, there are a variety of optimization algorithms that can be used to optimize the target value output by the objective function. Examples of optimization algorithms include, without limitation, alpha-beta pruning, branch and bound, Bruss, chain matrix multiplication, combinatorial, constraint satisfaction, cross-entropy, differential evolution, dynamic programming, ellipsoid method, evolutionary computation, Franke-Wolfe, genetic, golden-section search, gradient descent, grid search, harmony search, interior point method, linear programming, line search, local search, memetic, minimax, nearest neighbor search, Newton's method, nonlinear optimization, particle swarm, random search, simulated annealing, stochastic tunneling, and subset sum algorithms. While not every optimization algorithm will be suitable for every application, there will generally be a plurality of suitable optimization algorithms for any given applications. Thus, the user will need to determine which of the suitable optimization algorithms is the most suitable (e.g., in terms of optimality, computational time, etc.).

Consequently, even with automated optimization, a significant amount of time and effort is still required for a user to configure and evaluate optimization algorithms. In addition, if a user is managing a plurality of simulators 300 for a plurality of real-world systems (e.g., multiple supply chains for multiple customers), this time and effort must be multiplied across each simulator 300. In other words, in order to find a truly optimal solution, the user should configure and evaluate a plurality of optimization algorithms for a plurality of simulators 300.

Figure 4:
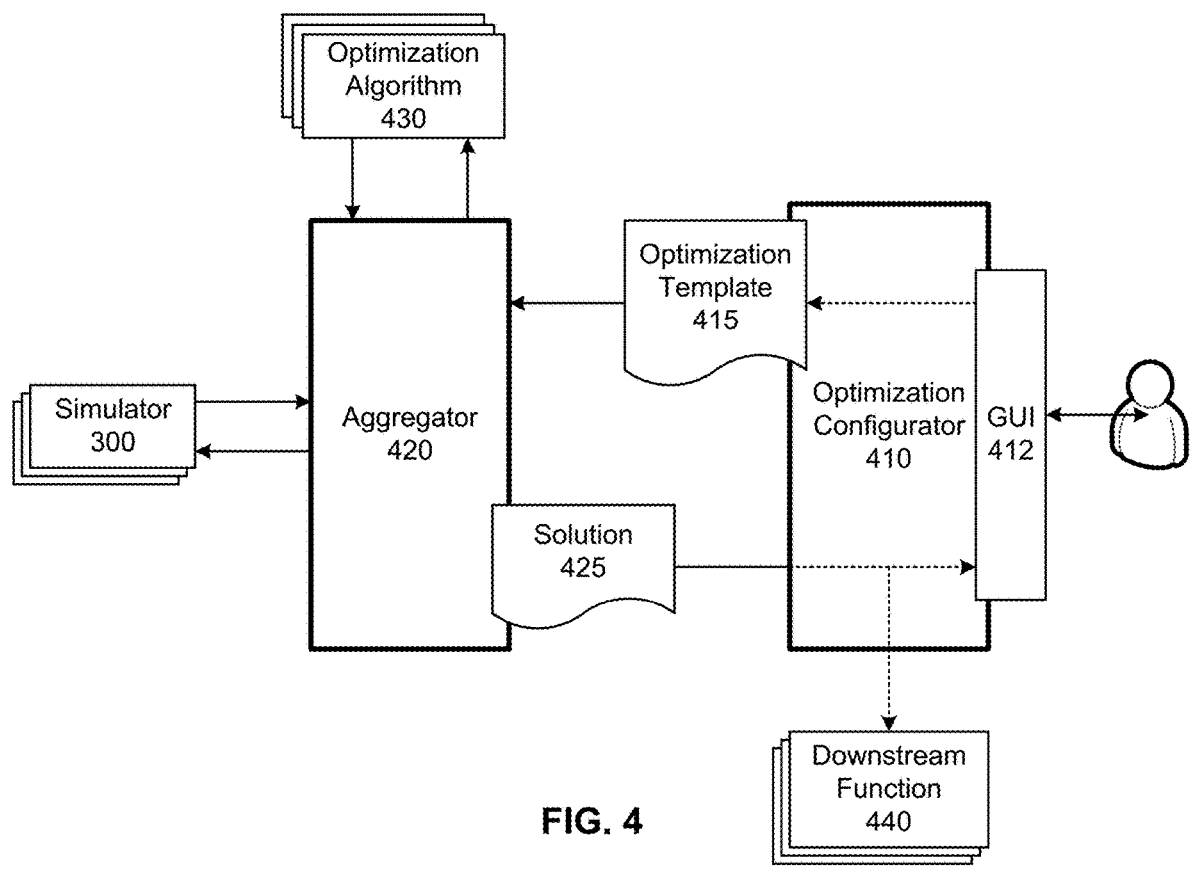
FIG. 4 illustrates automated simulation-based optimization, according to an embodiment.

FIG. 4 illustrates automated simulation-based optimization, according to an embodiment. Embodiments of the disclosed simulation-based optimization automate tasks that previously had to be performed manually. This enables comprehensive, robust, and faster optimization to support rapid decision-making concerning the operation of real-world systems.

In an embodiment, an optimization configurator 410 is provided. Optimization configurator 410 may be implemented in software 112 on platform 110. Optimization configurator 410 provides (e.g., generates) a graphical user interface 412 via which a user may interact with optimization configurator 410. In particular, the user may utilize graphical user interface 412 to generate an optimization template 415. For example, optimization configurator 410 may generate one or more lists of components of optimization template 415 in advance or dynamically, display the list(s) in graphical user interface 412, and receive selections of components from the list(s) via inputs of graphical user interface 412.

Each optimization template 415 may comprise one or more pairings of a simulator 300 with an optimization algorithm 430. Each pairing may be referred to herein as an "optimization configuration." The user may select from a list of simulators 300 and a list of optimization algorithms 430, displayed in graphical user interface 412, to construct these optimization configurations. The benefits of optimization template 415 are most apparent when a user constructs a plurality of optimization configurations. The plurality of optimization configurations may comprise the same simulator 300 paired with different optimization algorithms 430, the same optimization algorithm 430 paired with different simulators 300 (e.g., for different real-world systems, including, for example, different supply chains for different customers), and/or different simulators 300 paired with different optimization algorithms 430.

Optimization template 415 may also comprise other components that define aspects of optimization algorithm 430 in each optimization configuration. For example, these aspects may comprise an objective function to be used for optimization algorithm 430 and one or more parameters (e.g., variables and/or constraints) to be used in optimization algorithm 430. Again, these aspects (e.g., objective function and/or parameters) may be selected by a user from lists generated in advance or dynamically, and displayed in graphical user interface 412.

In an embodiment, an aggregator 420 is provided. Aggregator 420 may be implemented in software 112 on the backend of platform 110. Aggregator 420 performs optimization on each optimization template 415. In particular, aggregator 420 may receive an optimization template 415 to be run from optimization configurator 410 (e.g., via an extract-transform-load (ETL) operation). For each optimization configuration in each optimization template 415, aggregator 420 may execute the optimization algorithm 430 in that optimization configuration, as defined in optimization template 415, to perform simulation-based optimization using the paired simulator 300 in that optimization configuration.

For example, for each optimization configuration, aggregator 420 may execute the optimization algorithm 430 to determine first candidate value(s) for the variable(s) (e.g., $\{x_1, x_2, x_3, x_4\}$ in the illustrated example) of the simulator 300 that is paired to optimization algorithm 430 in the optimization configuration. Aggregator 420 may then execute the simulator 300, using the first candidate value(s) for the variable(s) in a first input 310, to produce a first output 320. Aggregator may then provide the first output 320 from simulator 300 to optimization algorithm 430 to determine second candidate value(s) for the variable(s) of simulator 300 based on the first output 320 (and potentially prior outputs 320). Aggregator may then execute the simulator 300, using these second candidate value(s) for the variable(s) in input 310, to produce a second output 320. This process may repeat over a plurality of iterations until optimization algorithm 430 determines that the output 320 is optimal. Optimization algorithm 430 may determine that output 320 is optimal based on one or more stopping criteria (e.g., convergence of the target value of the objective function, predefined number of iterations completed, etc.), which may differ between different optimization algorithms 430. At this point, the optimization is complete. It should be understood that this process may be repeated for every optimization configuration, to produce a solution 425 representing the optimal solution produced by each pairing of optimization algorithm 430 and simulator 300.

Once the optimization is complete for every optimization configuration in optimization template 415 or as the optimizations are completed for each optimization configuration in optimization template 415, aggregator 420 may provide solution 425 to optimization configurator 410. Solution 425 may comprise the optimal value of each variable of simulator 300, the optimal target value produced by the objective function for the optimal value(s) of the variable(s), and the value of each constraint produced by the optimal value(s) of the variable(s), for each optimization configuration that has been run by aggregator 420 from optimization template 415. It should be understood that solution 425 could comprise other data as well, such as one or more relevant key performance indicator(s) (e.g., if different than the target value of the objective function).

Optimization configurator 410 may receive solution 425 from aggregator 420 and display a representation of solution 425 to the user via graphical user interface 412. The user may review and evaluate solution 425 to determine whether or not changes are needed or desired. If so, the user may revise one or more settings of optimization template 415 via graphical user interface 412, and provide the revised optimization template 415 to aggregator 420 to be re-run. This revision process may iterate over one or a plurality of iterations until the user is satisfied with the solution 425 returned by aggregator 420.

Additionally or alternatively, optimization configurator 410 may provide at least a portion of solution 425 to one or more downstream functions 440. In particular, at least the optimal value(s) of the variable(s) may be provided from solution 425 to downstream function(s) 440. These optimal variable value(s) may represent an operating configuration of the real-world system represented by the associated simulator 310. Downstream function(s) 440 could comprise other optimizers or configurators, a control system of the real-world system being optimized, and/or the like. In the event that downstream function(s) 440 comprise a control system, optimization configurator 410 may initiate control of the real-world system by providing the optimal variable value(s) to the control system, which may be hosted on platform 110 or an external system 140. Optimization configurator 410 may provide the optimal variable value(s) to a downstream function 440 either automatically (i.e., without user intervention), semi-automatically (i.e., with user confirmation via graphical user interface 412), or manually (e.g., by providing the optimal variable value(s) to a user via graphical user interface 412, who then relays the optimal variable value(s) to the downstream function 440). In any case, the control may comprise ordering inventory in a supply chain, scheduling inventory orders for the supply chain, scheduling deliveries or other transport in the supply chain, scheduling shifts for workers in the supply chain, setting setpoints of the real-world system (e.g., in a manufacturing plant or warehouse), and/or the like.

4. Optimization Template

Figure 5:
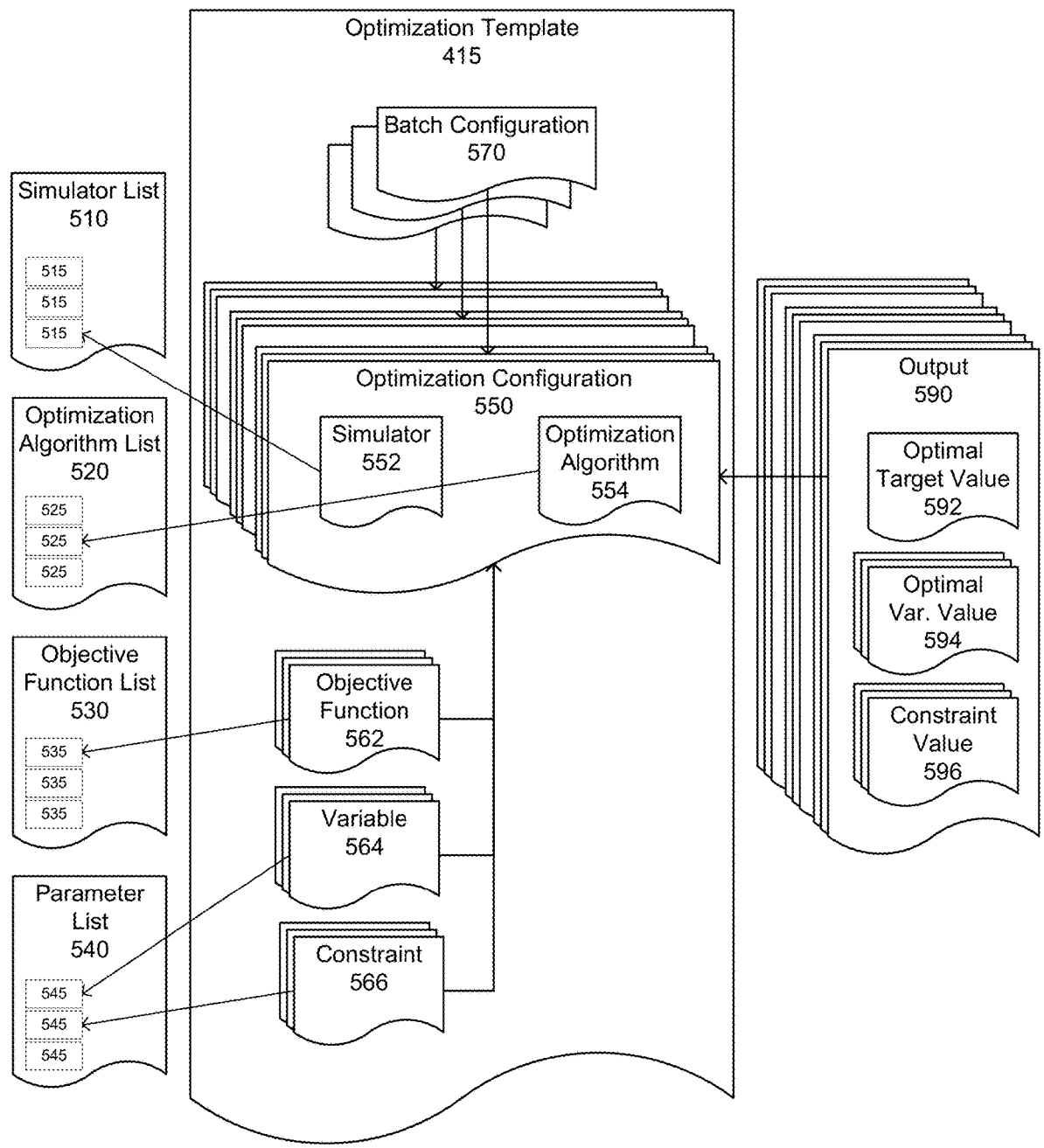
FIG. 5 illustrates an example of the construction of an optimization template, according to an embodiment.

FIG. 5 illustrates an example of the construction of optimization template 415, according to an embodiment. As discussed above, optimization configurator 410 may generate lists of components. From these lists, a user may select components to be incorporated into optimization template 415. For example, optimization configurator 410 may generate a simulator list 510, an optimization algorithm list 520, an objective function list 530, and/or a parameter list 540. Simulator list 510 may comprise entries 515 for all unique simulators 300 available to the user, optimization algorithm list 520 may comprise entries 525 for all unique optimization algorithms 430 available to the user, objective function list 530 may comprise entries 535 for all unique objective functions available to the user, and parameter list 540 may comprise entries 545 for all unique parameters available to the user. Thus, a user may quickly and easily generate an optimization template 415 by mixing and matching the various entries from each of simulator list 510, optimization algorithm list 520, objective function list 530, and parameter list 540.

As illustrated, optimization template 415 may comprise one or more optimization configurations 550. Each optimization configuration 550 pairs a simulator 552, selected from an entry 515 in simulator list 510, with an optimization algorithm 554, selected from an entry 525 in optimization algorithm list 520. Each simulator 552 is a data structure representing an actual simulator 300, and each optimization algorithm 554 is a data structure representing an actual optimization algorithm 430. In addition, optimization template 415 may comprise one or more objective functions 562, each selected from an entry 535 in objective function list. Optimization template 415 may also comprise one or more parameters, including one or more variables 564 and/or constraints 566, which are each selected from an entry 545 in parameter list 540. Objective function(s) 562, variable(s) 564, and constraint(s) 566 may be associated with a particular optimization configuration 550. Generally, a single objective function 562, a plurality of variables 564, and zero, one, or a plurality of constraints 566 will be associated with each optimization configuration 550. Objective function 562 represents the objective of optimization algorithm 554 in the associated optimization configuration 550, each variable 564 represents a variable in simulator 552 for which an optimal value is to be determined by optimization algorithm 554 in the associated optimization configuration 550, and each constraint 566 represents a constraint on optimization algorithm 554 in the associated optimization configuration 550. Each of the various data structures 550, 552, 554, 562, 564, and/or 566 may comprise one or more settings whose values can be automatically populated (e.g., with default values) and/or manually populated by a user (e.g., via graphical user interface 412).

In an embodiment, optimization template 415 may comprise one or more batch configurations 570. Each batch configuration 570 may package a plurality of optimization configurations 550 into a single batch that can be run (e.g., by aggregator 420) together. Thus, a user can define how optimization configurations 550 are batched. However, batch configuration(s) 570 may be an optional component of optimization template 415. In addition, batches could alternatively be implemented as a single optimization template 415 that comprises a plurality of optimization configurations 550. In this case, a user could create a plurality of optimization templates 415 that each represents a single batch of optimization configurations 550. In any case, a batch of optimization configurations 550 may be optimized together by aggregator 420, so that a user can leave aggregator 420 to run a plurality of optimization configurations 550 (e.g., overnight) without user intervention.

When an optimization template 415 is run (e.g., by aggregator 420), an output 590 will be produced for each optimization configuration 550. Each output 590 will represent the output of the simulation-based optimization by the optimization algorithm 554 of the associated optimization configuration 550, suing the simulator 552 of the associated optimization configuration 550. In an embodiment, output 590 comprises at least one optimal target value 592 output by the associated objective function 562, an optimal variable value for each associated variable 564, and a constraint value 596 for each associated constraint 566. Generally, an output 590 for a given optimization configuration 550 will comprise a single optimal target value 592, a plurality of optimal variable values 594, and zero, one, or a plurality of constraint values 596, and will be equal in number to the number of (i.e., with a one-to-one correspondence to) objective functions 562, variables 564, and constraints 566, respectively, that are associated with the optimization configuration 550.

Figure 6:
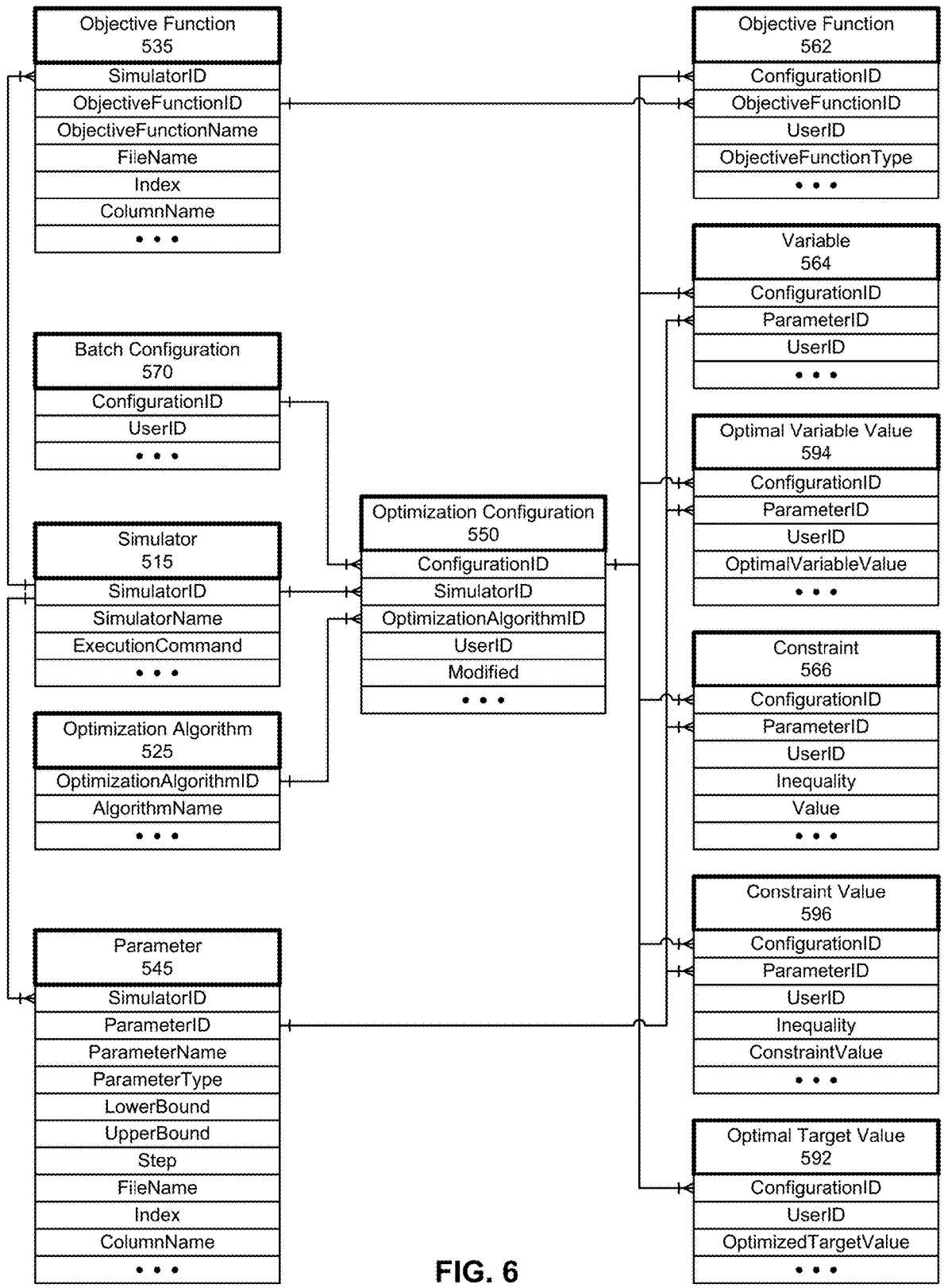
FIG. 6 illustrates examples of data structures for the various components illustrated in FIG. 5, according to an embodiment.

FIG. 6 illustrates example data structures for the various components illustrated in FIG. 5, according to an embodiment. The illustrated data structures depict examples of attributes, which may be represented, for example, as columns in a table of a relational database (e.g., in database(s) 114). It should be understood that any of the described data structures could comprise fewer, more, or different attributes than those illustrated.

Simulator 515 is a data structure representing a particular simulator 300. Simulator list 510 may comprise one or a plurality of simulators 515. Each simulator 515 may comprise a simulator identifier SimulatorID (e.g., as a string value) that uniquely identifies a simulator 300, a simulator name SimulatorName (e.g., as a string value) that comprises a user-friendly name for the identified simulator 300, and an execution command ExecutionCommand (e.g., as a string value) for executing the identified simulator 300. The primary key for simulator 515 may comprise or consist of SimulatorID.

Optimization algorithm 525 is a data structure representing a particular optimization algorithm 430. Optimization algorithm list 520 may comprise one or a plurality of optimization algorithms 525. Each optimization algorithm 525 may comprise an optimization algorithm identifier OptimizationAlgorithmID (e.g., as a string value) that uniquely identifies an optimization algorithm 430, and an algorithm name AlgorithmName (e.g., as a string value) that comprises a user-friendly name for the identified optimization algorithm 430. The primary key for optimization algorithm 525 may comprise or consist of AlgorithmID.

Objective function 535 is a data structure representing a particular objective function. Objective function list 530 may comprise one or a plurality of objective functions 535. Each objective function 535 may comprise a simulator identifier SimulatorID (e.g., as a string value) that refers to a simulator 515, an objective function identifier ObjectiveFunctionID (e.g., as a string value) that uniquely identifies the objective function, an objective function name ObjectiveFunctionName (e.g., as a string value) that comprises a user-friendly name for the objective function, a file name FileName (e.g., as a string value) that refers to a file that defines the objective function (e.g., defines how variables are combined in the objective function to obtain the target value), an index Index (e.g., as an integer value) that comprises the row number of ObjectiveFunctionID, and a column name ColumnName (e.g., as a string value) that comprises the column name of ObjectiveFunctionID. The primary key for objective function 535 may comprise or consist of SimulatorID and ObjectiveFunctionID. One or a plurality of objective functions 535 may be linked to a single simulator 515 via SimulatorID.

Parameter 545 is a data structure representing a particular parameter. Parameter list 540 may comprise one or a plurality of parameters 545. Each parameter 545 may comprise a simulator identifier SimulatorID (e.g., as a string value) that refers to a simulator 515, a parameter identifier ParameterID (e.g., as a string value) that uniquely identifies the parameter, a parameter name ParameterName (e.g., as a string value) that comprises a user-friendly name for the parameter, a parameter type ParameterType (e.g., as a string value) that identifies the type of the parameter (e.g., binary, integer, continuous, etc.), a lower bound LowerBound (e.g., as a double value) that defines a lower bound for the value of the parameter (if applicable), an upper bound UpperBound (e.g., as a double value) that defines an upper bound for the value of the parameter (if applicable), a step Step (e.g., as a double value) that defines a step for the value of the parameter (if applicable), a filename FileName (e.g., as a string value) that refers to a file that includes the value of the parameter, an index Index (e.g., as an integer value) that comprises the row number of ParameterID, and a column name ColumnName (e.g., as a string value) that comprises the column name of ParameterID. The primary key for parameter 545 may comprise or consist of SimulatorID and ParameterID. One or a plurality of parameters 545 may be linked to a single simulator 515 via SimulatorID.

Collectively, all instances of simulators 515, optimization algorithms 525, objective functions 535, and parameters 545 represent the master data, from which optimization templates 415 are generated. In particular, optimization configurator 410 may retrieve, from database(s) 114, all instances of simulators 515 to generate simulator list 510, all instances of optimization algorithms 525 to generate optimization algorithm list 520, all instances of objective functions 535 to generate objective function list 530, and/or all instances of parameters 545 to generate parameter list 540. As discussed elsewhere herein, a user may select instances of simulators 515, optimization algorithms 525, objective functions 535, and/or parameters 545 from the master data, via graphical user interface 412, to construct an optimization template 415.

Optimization configuration 550 is a data structure representing an optimization configuration comprising a pairing of a particular simulator 300 (e.g., via selection of a corresponding simulator 515 from simulator list 510) with a particular optimization algorithm 430 (e.g., via selection of a corresponding optimization algorithm 525 from optimization algorithm list 520). Each optimization configuration 550 may comprise a configuration identifier ConfigurationID (e.g., as an integer value) that uniquely identifies an optimization configuration, a simulator identifier SimulatorID (e.g., as a string value) that refers to a simulator 515, an optimization algorithm identifier OptimizationAlgorithmID (e.g., as a string value) that refers to an optimization algorithm 525, a user identifier UserID (e.g., as a string value) that identifies the user who owns the optimization configuration, and a timestamp Modified (e.g., as a datetime value) representing the last time that the optimization configuration was run. The primary key for optimization configuration 550 may comprise or consist of ConfigurationID, SimulatorID, OptimizationAlgorithmID, and UserID. One or a plurality of optimization configurations 550 may be linked to a single simulator 515 via SimulatorID, and one or a plurality of optimization configurations 550 may be linked to a single optimization algorithm 525 via OptimizationAlgorithmID.

Batch configuration 570 is a data structure representing a batch of optimization configurations 550. Each batch configuration 570 may comprise a configuration identifier ConfigurationID (e.g., as an integer value) that refers to an optimization configuration 550, and a user identifier UserID (e.g., as a string value) that identifies the user who owns the batch configuration. The primary key for batch configuration 570 may comprise or consist of ConfigurationID and UserID. A single batch configuration 570 may be linked to one or a plurality of optimization configurations 550 via ConfigurationID.

Objective function 562 is a data structure representing an objective function for an optimization algorithm 430. Each objective function 562 may comprise a configuration identifier ConfigurationID (e.g., as an integer value) that refers to an optimization configuration 550, an objective function identifier ObjectiveFunctionID (e.g., as a string value) that refers to an objective function 535, a user identifier UserID (e.g., as a string value) that identifies the user who owns the objective function, and a type of the objective function ObjectiveFunctionType (e.g., as a string value) that indicates the objective of the objective function (e.g., minimum or maximum). The primary key for objective function 562 may comprise or consist of ConfigurationID, ObjectiveFunctionID, and UserID. One or a plurality of objective functions 562 may be linked to a single optimization configuration 550 via ConfigurationID, and one or a plurality of objective functions 562 may be linked to a single objective function 535 in the master data via ObjectiveFunctionID.

Variable 564 is a data structure representing a variable in a simulator 300 to be optimized by an optimization algorithm 430. Each variable 564 may comprise a configuration identifier ConfigurationID (e.g., as an integer value) that refers to an optimization configuration 550, a parameter identifier ParameterID (e.g., as a string value) that refers to a parameter 545, and a user identifier UserID (e.g., as a string value) that identifies the user who owns the variable. The primary key for variable 564 may comprise or consist of ConfigurationID, ParameterID, and UserID. One or a plurality of variables 564 may be linked to a single optimization configuration 550 via ConfigurationID, and one or a plurality of variables 564 may be linked to a single parameter 545 in the master data via ParameterID.

Constraint 566 is a data structure representing a constraint for an optimization algorithm 430. Each constraint 566 may comprise a configuration identifier ConfigurationID (e.g., as an integer value) that refers to an optimization configuration 550, a parameter identifier ParameterID (e.g., as a string value) that refers to a parameter 545, a user identifier UserID (e.g., as a string value) that identifies the user who owns the variable, an operator Inequality (e.g., as a string value) that identifies the operator to be used for the constraint (e.g., less than, less than or equal to, greater than, greater than or equal to, or equals), and a value Value (e.g., as a double value) comprising the value of the constraint to be applied to the identified parameter according to the identified operator. The primary key for constraint 566 may comprise or consist of ConfigurationID, ParameterID, UserID, and Inequality. One or a plurality of constraints 566 may be linked to a single optimization configuration 550 via ConfigurationID, and one or a plurality of constraints 566 may be linked to a single parameter 545 in the master data via ParameterID.

Optimal target value 592 is a data structure representing the optimal target value output by an objective function according to the solution of an optimization algorithm 430. Each optimal target value 592 may comprise a configuration identifier ConfigurationID (e.g., as an integer value) that refers to an optimization configuration 550, a user identifier UserID (e.g., as a string value) that identifies the user who owns optimal target value 592, and an optimal target value OptimalTargetValue (e.g., as a double value) comprising the optimal target value. The primary key for optimal target value 592 may comprise or consist of ConfigurationID and UserID. One or a plurality of optimal target values 592 may be linked to a single optimization configuration 550 via ConfigurationID.

Optimal variable value 594 is a data structure representing the optimal value of a variable in the solution of an optimization algorithm 430. Each optimal variable value 594 may comprise a configuration identifier ConfigurationID (e.g., as an integer value) that refers to an optimization configuration 550, a parameter identifier ParameterID (e.g., as a string value) that refers to a parameter 545, a user identifier UserID (e.g., as a string value) that identifies the user who owns optimal variable value 594, and an optimal variable value OptimalVariableValue (e.g., as a double value) comprising the optimal variable value. The primary key for optimal variable value 594 may comprise or consist of ConfigurationID, ParameterID, and UserID. One or a plurality of optimal variable values 594 may be linked to a single optimization configuration 550 via ConfigurationID, and one or a plurality of optimal variable values 594 may be linked to a single parameter 545 in the master data via ParameterID.

Constraint value 596 is a data structure representing the final value of a constraint, produced by the solution to an optimization algorithm 430. Each constraint value 596 may comprise a configuration identifier ConfigurationID (e.g., as an integer value) that refers to an optimization configuration 550, a parameter identifier ParameterID (e.g., as a string value) that refers to a parameter 545, a user identifier UserID (e.g., as a string value) that identifies the user who owns constraint value 596, an operator Inequality (e.g., as a string value) that identifies the operator used for the constraint (e.g., less than, less than or equal to, greater than, greater than or equal to, or equals), and a constraint value ConstraintValue (e.g., as a double value) comprising the final value of the constraint. The primary key for constraint value 596 may comprise or consist of ConfigurationID, ParameterID, UserID, and Inequality. One or a plurality of constraint values 596 may be linked to a single optimization configuration 550 via ConfigurationID, and one or a plurality of constraint values 596 may be linked to a single parameter 545 in the master data via ParameterID.

5. Example Data Structures

FIGS. 7A-7D illustrate some example instances of data objects for simulation-based optimization using the specific simulator 300 for supply chain management in FIG. 3, according to an embodiment. For the purposes of description, the data objects are illustrated as tables with actual values for each cell. However, it should be understood that the data objects may be represented in other various forms, and the values should not be construed as limiting in any manner.

FIG. 7A illustrates tables for input 310 and output 320. Input 310 defines the values for a plurality of variables $\{x_1, x_2, x_3, x_4\}$ by associating a ParameterID for each variable with a Directory and FileName of the file that contains the value for that variable. These variables may be defined for different items (e.g., different products) using ItemID and different components of the real-world system (e.g., various warehouses) using SiteName. Output 320 may associate key performance indicators with different items and/or components of the real-world system via an association of KPI with ItemID and SiteName. Output 320 also defines the value of each key performance indicator in KPIValue.

FIG. 7B illustrates tables for simulator list 510, optimization algorithm list 520, objective function list 530, and parameter list 540. Each row in simulator list 510 represents a different simulator 300 that may be selected for an optimization configuration 550, and each row in optimization algorithm list 520 represents a different optimization algorithm 430 that may be selected for an optimization configuration 550. Each row in objective function list 530 represents an objective function that may be selected for an optimization configuration 550. In the illustrated example, there is only a single available objective function, AvgInv, which calculates the average inventory as its target value. Each row in parameter list 540 represents a parameter that may be selected for an optimization configuration 550, as either a variable or constraint.

Figure 7C:
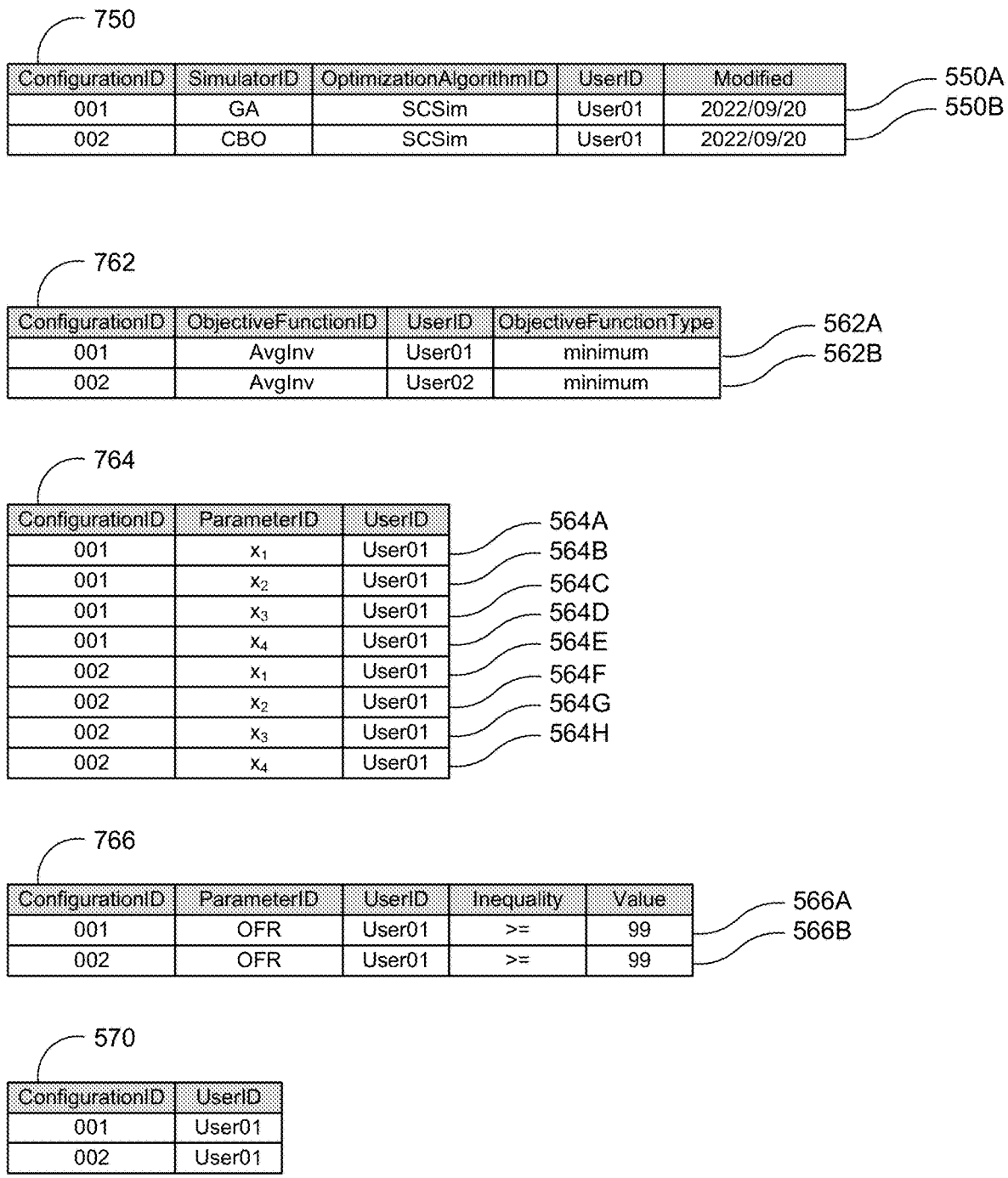

FIG. 7C illustrates an optimization configuration table 750, an objective function table 762, a variable table 764, a constraint table 766, and a batch configuration 570 for an optimization template 415. Each row in optimization configuration table 750 represents a single optimization configuration 550 (e.g., 550A or 550B) that associates a simulator 300 (e.g., represented by SimulatorID) with an optimization algorithm 430 (e.g., represented by OptimizationAlgorithmID). Each row in objective function table 762 represents a single objective function 562 (e.g., 562A or 562B), associated with an optimization configuration 550 in optimization configuration table 750 (e.g., linked by ConfigurationID). Notably, in this example, each optimization algorithm 430 in each optimization configuration 550A and 550B is linked to the AvgInv objective function with an objective of minimizing the target value (e.g., as represented by ObjectiveFunctionType). Each row in variable table 764 represents a single variable 564 (e.g., 564A, 564B, 564C, 564D, 564E, 564F, 564G, or 564H), associated with an optimization configuration 550 in optimization configuration table 750 (e.g., linked by ConfigurationID), and each row in constraint table 766 represents a single constraint 566 (e.g., 566A or 566B), associated with an optimization configuration 550 in optimization configuration table 750 (e.g., linked by ConfigurationID). Each row in batch configuration 570 represents a single optimization configuration 550 in optimization configuration table 750 that is to be included in the batch represented by batch configuration 570.

Figure 7D:
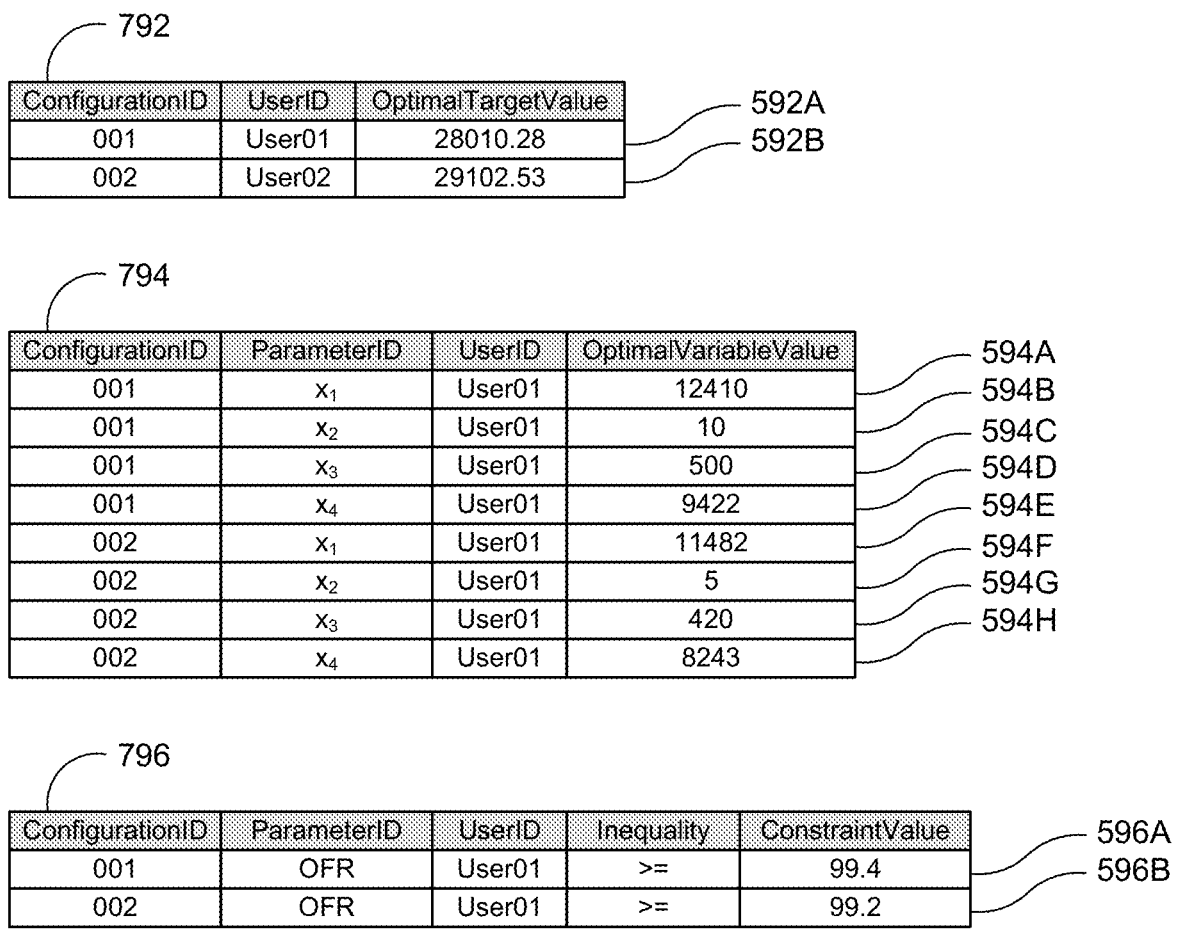

FIG. 7D illustrates an optimal target value table 792, an optimal variable value table 794, and a constraint value table 796. Each row in optimal target value table 792 represents a single optimal target value 592 (e.g., 592A or 592B), output from an optimization configuration 550 in optimization configuration table 750 (e.g., linked by ConfigurationID). Each row in optimal variable value table 794 represents a single optimal variable value 594 (e.g., 594A, 594B, 594C, 594D, 594E, 594F, 594G, or 594H) for an optimization configuration 550 in optimization configuration table 750 (e.g., linked by ConfigurationID). The value of each optimal variable value 594, following optimization, is contained in OptimalVariableValue. Each row in constraint value table 796 represents a single constraint value 596 (e.g., 596A or 596B) resulting from optimization for an optimization configuration 550 in optimization configuration table 750 (e.g., linked by ConfigurationID).

It should be understood that each constraint value 596 represents the value of a parameter 545 following optimization. In general, this value should satisfy the expression given by the corresponding constraint 566. For example, constraint 566A expresses an inequality of Order Fulfillment Rate (OFR)>=99. Following optimization, the corresponding value of constraint 566A is given by constraint value 596A, which indicates that the Order Fulfillment Rate, given the optimal variable values associated with the same optimization configuration 550 (i.e., optimal variable values 594A-594D), is 99.4. Since 99.4>=99, constraint 566A is satisfied by the optimal variable values 594A-594D. Thus, when evaluating a solution 425, a user may view constraint values 596 (e.g., via graphical user interface 412) to verify that constraint values 596 satisfy their corresponding constraints 566.

6. Process Overview

Figure 8:
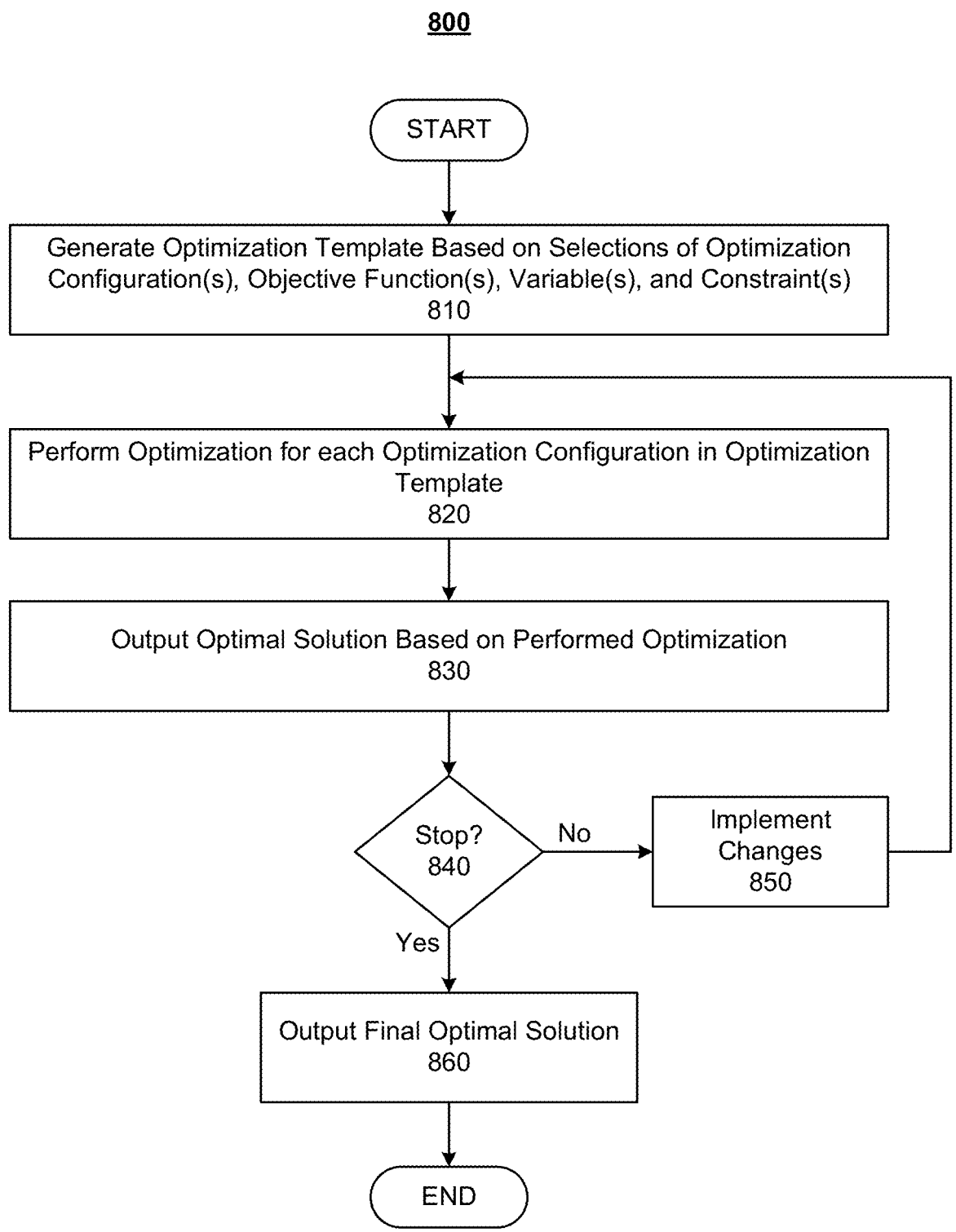
FIG. 8 illustrates a process for simulation-based optimization, according to an embodiment.

FIG. 8 illustrates a process 800 for simulation-based optimization, according to an embodiment. While process 800 is illustrated with a certain arrangement and ordering of subprocesses, process 800 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Process 800 may be embodied in one or more software modules that are executed by one or more hardware processors (e.g., processor 210), for example, as a software application (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the software application are executed by platform 110 and other portions or modules of the software application are executed by user system(s) 130. The described processes may be implemented as instructions represented in source code, object code, and/or machine code. These instructions may be executed directly by hardware processor(s) 210, or alternatively, may be executed by a virtual machine operating between the object code and hardware processor(s) 210.

Alternatively, process 800 may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Process 800 may be executed for each optimization template 415 that is desired to be generated and run. Initially, in subprocess 810, the optimization template 415 is generated. Subprocess 810 may be implemented in optimization configurator 410.

For example, one or more optimizations configurations 550 may be received. Each optimization configuration 550 associates an optimization algorithm 430 with a simulator 300 of a real-world system, such as a supply chain, via an association of a data structure 525 representing the optimization algorithm 430 with a data structure 515 representing the simulator 300. Receiving an optimization configuration 550 may comprise receiving a selection of a simulator 515 from a plurality of available simulators (e.g., from simulator list 510) and an associated selection of an optimization algorithm 525 from a plurality of available optimization algorithms (e.g., from optimization algorithm list 520), receiving a selection of an optimization configuration 550 from among a plurality of available optimization configurations 550, and/or the like. These selections may be performed manually by a user via graphical user interface 412 of optimization configurator 410, or automatically or semi-automatically by another system. The selections may comprise specifying the values of one or more settings in the optimization configuration(s) 550.

In addition, one or more objective functions 562 may be received and associated with one of the optimization configuration(s) 550. Receiving an objective function 562 may comprise receiving a selection of an objective function 535 from among a plurality of available objective functions 535 (e.g., from objective function list 530). The selection may be performed manually by a user via graphical user interface 412 of optimization configurator 410, or automatically or semi-automatically by another system. The selection may comprise specifying the values of one or more settings in the objective function(s) 562.

In addition, one or more variables 564 may be received and associated with one of the optimization configuration(s) 550 (e.g., and indirectly associated with an objective function 562 via common association with optimization configuration 550). Receiving a variable 564 may comprise receiving a selection of a parameter 545 from among a plurality of available parameters 545 (e.g., from parameter list 540). The selection may be performed manually by a user via graphical user interface 412 of optimization configurator 410, or automatically or semi-automatically by another system. The selection may comprise specifying the values of one or more settings in the variable(s) 564.

In addition, one or more constraints 566 may be received and associated with one of the optimization configuration(s) 550 (e.g., and indirectly associated with an objective function 562 via common association with optimization configuration 550). Receiving a constraint 566 may comprise receiving a selection of a parameter 545 from among a plurality of available parameters 545 (e.g., from parameter list 540). The selection may be performed manually by a user via graphical user interface 412 of optimization configurator 410, or automatically or semi-automatically by another system. The selection may comprise specifying the values of one or more settings in the constraint(s) 566.

In addition, one or more batch configurations 570 may be received and associated with one or plurality of the optimization configuration(s) 550. Receiving a batch configuration 570 may comprise receiving a selection of one or a plurality of optimization configurations 550 from among a plurality of available optimization configurations 550 (e.g., all optimization configurations 550 added to optimization template 415), assigning each optimization configuration 550 to a batch configuration 570 as it is received or created, and/or the like. The assignment of optimization configuration(s) 550 to batch configuration(s) 570 may be performed manually by a user via a graphical user interface 412 of optimization configurator 410, or automatically or semi-automatically by another system.

As mentioned above, subprocess 810 may also comprise receiving one or more settings of optimization template 415. For example, these settings may comprise defining particular attributes of objective function(s) 562 (e.g., ObjectiveFunctionType), constraint(s) 566 (e.g., Inequality, Value), and/or the like. Attributes which require setting may be initially populated with default values. The user may edit these default values as needed or desired (e.g., via graphical user interface 412).

In subprocess 820, optimization is performed for each optimization configuration 550 in the optimization template 415 that was generated in subprocess 810. In particular, for each objective function 562 associated with each optimization configuration 550 in optimization template 415, the optimization algorithm 430 associated with the optimization configuration 550 (via data structure 554) is executed to determine optimal variable value(s) 594 for each variable 564 associated with the objective function 562 (e.g., via optimization configuration 550), that optimize the objective function 562, while constrained by constraint(s) 596 associated with the objective function 562 (e.g., via optimization configuration 550), using the simulator 300 associated with the optimization algorithm 430 in optimization configuration 550 (e.g., via data structure 552). Subprocess 820 may be implemented in aggregator 420.

Subprocess 820 produces an optimal solution 425. Solution 425 may comprise an output 590 for each optimization configuration 550 in the optimization template 415 that was generated in subprocess 810 and run in subprocess 820. Each output 590 may comprise an optimal target value 592 produced by an objective function 562 associated with the respective optimization configuration 550, an optimal variable value 594 for each variable 564 associated with the respective optimization configuration 550, and a constraint value 596 for each constraint 566 associated with the respective optimization configuration 550.

In subprocess 830, a representation of solution 425 may be output. For example, solution 425 may be provided by aggregator 420 to optimization configurator 410 and output to graphical user interface 412 for review by a user. The user may review solution 425 to evaluate the performance of the optimization, verify that each constraint 566 is satisfied, and/or the like. The performance of the optimization may be evaluated based on one or more stopping criteria. Alternatively, optimization configurator 410 may automatically evaluate solution 425 to determine whether or not one or more stopping criteria are satisfied and/or the constraint(s) 566 are satisfied.

Whether manually or automatically applied, when the one or more stopping criteria are not satisfied (i.e., "No" in subprocess 840), process 800 may proceed to subprocess 850. Otherwise, when the one or more stopping criteria are satisfied (i.e., "Yes" in subprocess 840), process 800 may proceed to subprocess 860.

In subprocess 850, one or more changes may be implemented to optimization template 415. For example, the user may manually evaluate current settings in optimization template 415 and/or elsewhere, and change one or more of these settings via graphical user interface 412 of optimization configurator 410. Alternatively or additionally, optimization configurator 410 may automatically change one or more settings according to any suitable learning mechanism.

In subprocess 860, a final optimal solution is output. The final optimal solution may be the solution 425 that is output in the final or most recent iteration of subprocess 830 or the best solution 425 output across all iterations of subprocess 830. Optimization configurator 410 may provide the final optimal solution to the user via graphical user interface 412 and/or to one or more downstream functions 440 (e.g., to initiate control of real-world system(s) associated with the optimization using the optimal variable value(s) 594 in the final optimal solution as operating configuration(s) for the real-world system(s)).

Embodiments of optimization configurator 410 may enable faster selection of objective functions, variables, and constraints (e.g., using lists 530 and 540), may reduce development time for selecting the best optimization algorithm 430 for each simulator 300 (e.g., using optimization template 415), may reduce development time for deploying an optimization algorithm 430 to a new simulator 300 (e.g., using optimization template 415), are applicable to various domains (e.g., other than supply chain management), may enable the determination of an optimal solution for any simulator 300 without specialized user knowledge regarding optimization, may enable multiple optimal solutions from multiple optimization algorithms 430 to be determined in a single batch (e.g., using batch configuration 570), may improve the efficiency of a supply chain or other domain (e.g., by lowering inventory cost, lowering logistical cost due to less development time for simulation-based optimization), and/or achieve one or more other advantages.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
   generate an optimization template by
      displaying lists of components in a graphical user interface that enables user interaction with an optimization configurator to generate the optimization template, wherein the optimization configurator generates and displays the lists and receives selections via inputs of the graphical user interface,
   receiving a plurality of optimization configurations through user selections from the displayed lists, wherein each of the one or more optimization configurations comprises a pairing of a simulator selected from a simulator list with an optimization algorithm selected from an optimization algorithm list, each of the plurality of optimization configurations associating an optimization algorithm with a simulator of a real-world system, wherein at least one of the plurality of optimization configurations associates a different optimization algorithm with a same simulator, associates a same optimization algorithm with a different simulator, or associates a different optimization algorithm with a different simulator, than another one of the plurality of optimization configurations, and wherein a first one of the plurality of optimization configurations associates a first optimization algorithm with a first simulator of a first real-world system, and wherein a second one of the plurality of optimization configurations associates the first optimization algorithm with a second simulator of a second real-world system that is different from the first real-world system,
   receiving a plurality of objective functions, each of the plurality of objective functions associated with one of the plurality of optimization configurations,
   receiving one or more variables, each of the one or more variables associated with one of the plurality of objective functions, and
   receiving one or more constraints, each of the one or more constraints associated with one of the plurality of objective functions;
   perform an optimization on the optimization template by, for each of the plurality of objective functions associated with each of the plurality of optimization configurations in the optimization template, executing the optimization algorithm in the optimization configuration to determine values for the one or more variables, associated with the objective function, that optimize the objective function, while constrained by the one or more constraints associated with the objective function, using the simulator in the optimization configuration;
   output an optimal solution based on the performed optimization, wherein the one or more optimization configurations are a plurality of optimization configurations; and
   initiate control of the real-world system based on the optimal solution.

2. The method of claim 1, wherein the optimization template is generated by further receiving one or more batch configurations, each of the one or more batch configurations comprising a plurality of optimization configurations, and wherein the optimization is performed for each of the one or more objective functions associated with each of the one or more optimization configurations in each of the one or more batch configurations in the optimization template.

3. The method of claim 1, further comprising using the at least one hardware processor to, after performing the optimization, over each of one or more subsequent iterations:
   receive a user operation comprising one or more changes to the optimization template;
   incorporate the one or more changes into the optimization template; and
   perform the optimization on the changed optimization template.

4. The method of claim 1, wherein each simulator utilizes a digital twin of the real-world system to generate an output from an input.

5. The method of claim 4, wherein using the simulator associated with the optimization algorithm comprises:
   determining first candidate values for the one or more variables and executing the simulator using the first candidate values as input to produce a first output; and determining second candidate values for the one or more variables based on the first output and executing the simulator using the second candidate values as input to produce a second output.

6. The method of claim 4, wherein the output of each simulator is a key performance indicator for the real-world system.

7. The method of claim 4, wherein the real-world system comprises a supply chain.

8. The method of claim 7, wherein the output of each simulator comprises one or both of an average inventory quantity or an order fulfillment rate.

9. The method of claim 1, wherein receiving one or more optimization configurations comprises receiving a user selection of the one or more optimization configurations from among a plurality of available optimization configurations.

10. The method of claim 1, wherein receiving one or more objective functions comprises receiving a user selection of the one or more objective functions from among a plurality of available objective functions.

11. The method of claim 1, wherein receiving one or more variables comprises receiving a user selection of the one or more variables from among a plurality of available variables, and wherein receiving one or more constraints comprises receiving a user selection of the one or more constraints from among a plurality of available constraints.

12. The method of claim 1, wherein the one or more objective functions are a plurality of objective functions.

13. The method of claim 1, wherein the optimal solution comprises, for each of the one or more objective functions associated with each of the one or more optimization configurations in the optimization template, the determined values for the one or more variables.

14. The method of claim 13, wherein the optimal solution further comprises, for each of the one or more objective functions associated with each of the one or more optimization configurations in the optimization template, an output of a target value of the objective function for the determined values of the one or more variables, and values of the one or more constraints.

15. A system comprising:
at least one hardware processor; and
software configured to, when executed by the at least one hardware processor,
generate an optimization template by
displaying lists of components in a graphical user interface that enables user interaction with an optimization configurator to generate the optimization template, wherein the optimization configurator generates and displays the lists and receives selections via inputs of the graphical user interface,
receiving a plurality of optimization configurations through user selections from the displayed lists, wherein each of the one or more optimization configurations comprises a pairing of a simulator selected from a simulator list with an optimization algorithm selected from an optimization algorithm list, each of the plurality of optimization configurations associating an optimization algorithm with a simulator of a real-world system, wherein at least one of the plurality of optimization configurations associates a different optimization algorithm with a same simulator, associates a same optimization algorithm with a different simulator, or associates a different optimization algorithm with a different simulator, than another one of the plurality of optimization configurations, and wherein a first one of the plurality of optimization configurations associates a first optimization algorithm with a first simulator of a first real-world system, and wherein a second one of the plurality of optimization configurations associates the first optimization algorithm with a second simulator of a second real-world system that is different from the first real-world system,
receiving a plurality of objective functions, each of the plurality of objective functions associated with one of the plurality of optimization configurations,
receiving one or more variables, each of the one or more variables associated with one of the plurality of objective functions, and receiving one or more constraints, each of the one or more constraints associated with one of the plurality of objective functions;
perform an optimization on the optimization template by, for each of the plurality of objective functions associated with each of the plurality of optimization configurations in the optimization template, executing the optimization algorithm in the optimization configuration to determine values for the one or more variables, associated with the objective function, that optimize the objective function, while constrained by the one or more constraints associated with the objective function, using the simulator in the optimization configuration;
output an optimal solution based on the performed optimization, wherein the one or more optimization configurations are a plurality of optimization configurations; and
initiate control of the real-world system based on the optimal solution.

16. A non-transitory computer-readable medium having instructions stored thereon, wherein the instructions, when executed by a processor, cause the processor to:
generate an optimization template by
displaying lists of components in a graphical user interface that enables user interaction with an optimization configurator to generate the optimization template, wherein the optimization configurator generates and displays the lists and receives selections via inputs of the graphical user interface,
receiving a plurality of optimization configurations through user selections from the displayed lists, wherein each of the one or more optimization configurations comprises a pairing of a simulator selected from a simulator list with an optimization algorithm selected from an optimization algorithm list, each of the plurality of optimization configurations associating an optimization algorithm with a simulator of a real-world system, wherein at least one of the plurality of optimization configurations associates a different optimization algorithm with a same simulator, associates a same optimization algorithm with a different simulator, or associates a different optimization algorithm with a different simulator, than another one of the plurality of optimization configurations, and wherein a first one of the plurality of optimization configurations associates a first optimization algorithm with a first simulator of a first real-world system, and wherein a second one of the plurality of optimization configurations associates the first optimization algorithm with a second simulator of a second real-world system that is different from the first real-world system, receiving a plurality of objective functions, each of the plurality of objective functions associated with one of the plurality of optimization configurations, receiving one or more variables, each of the one or more variables associated with one of the plurality of objective functions, and receiving one or more constraints, each of the one or more constraints associated with one of the plurality of objective functions;

perform an optimization on the optimization template by, for each of the plurality of objective functions associated with each of the plurality of optimization configurations in the optimization template, executing the optimization algorithm in the optimization configuration to determine values for the one or more variables, associated with the objective function, that optimize the objective function, while constrained by the one or more constraints associated with the objective function, using the simulator in the optimization configuration;

output an optimal solution based on the performed optimization, wherein the one or more optimization configurations are a plurality of optimization configurations; and initiate control of the real-world system based on the optimal solution.

\* \* \* \* \*